United States Patent [19]
Howard

[11] Patent Number: 4,793,578
[45] Date of Patent: Dec. 27, 1988

[54] MULTIPLE CONDUIT SUPPORT SYSTEM

[76] Inventor: Harold L. Howard, 4800 Northway Dr., #14C, Dallas, Tex. 75206

[21] Appl. No.: 117,963

[22] Filed: Nov. 9, 1987

[51] Int. Cl.$^4$ .............................................. E21F 17/02
[52] U.S. Cl. ..................................... 248/62; 248/68.1; 248/74.1
[58] Field of Search ................. 248/68.1, 69, 62, 74.1, 248/49, 58, 59, 63, 65, 74.4; 165/162; 52/27; 174/163 R; 403/170, 171

[56] References Cited

U.S. PATENT DOCUMENTS

| | | | |
|---|---|---|---|
| 873,198 | 12/1907 | Wilson | 248/62 |
| 1,514,455 | 11/1924 | Gordon | 248/62 X |
| 1,605,996 | 11/1926 | Stewart | 248/62 X |
| 1,798,167 | 3/1931 | Parker . | |
| 1,883,935 | 10/1932 | Kelley | 248/68.1 X |
| 2,111,357 | 3/1938 | Cornell | 248/62 X |
| 2,212,455 | 8/1940 | Reed | 403/170 X |
| 2,302,668 | 11/1942 | Banneyer . | |
| 2,546,043 | 3/1951 | Parmenter | 403/171 |
| 3,230,295 | 1/1966 | Short | 248/68.1 X |
| 3,493,206 | 2/1970 | Albro | 248/62 X |
| 3,789,562 | 2/1974 | Chicchis | 403/171 X |
| 3,856,246 | 5/1972 | Sinke . | |
| 4,493,468 | 1/1985 | Roach . | |

FOREIGN PATENT DOCUMENTS 8102668 1/1983 Netherlands ..................... 248/68.1

Primary Examiner—J. Franklin Foss
Attorney, Agent, or Firm—Richards, Harris, Medlock & Andrews

[57] ABSTRACT

A system of threaded components is provided for hanging and supporting multiple conduit lines from a support structure. The system includes threaded rods of various lengths, internally threaded cross members, and support rings having threaded connectors and various inside diameters for clamping around pipes of different outside diameters. The support rings and cross members may be threaded onto the threaded rods in any configuration to support sections of multiple conduit lines from a single threaded rod attached to the support structural. The three basic components of the system in various sizes allow sections of several parallel conduit lines to be supported from a single point and allow additional conduit lines to be added later to a previously installed support system.

8 Claims, 2 Drawing Sheets

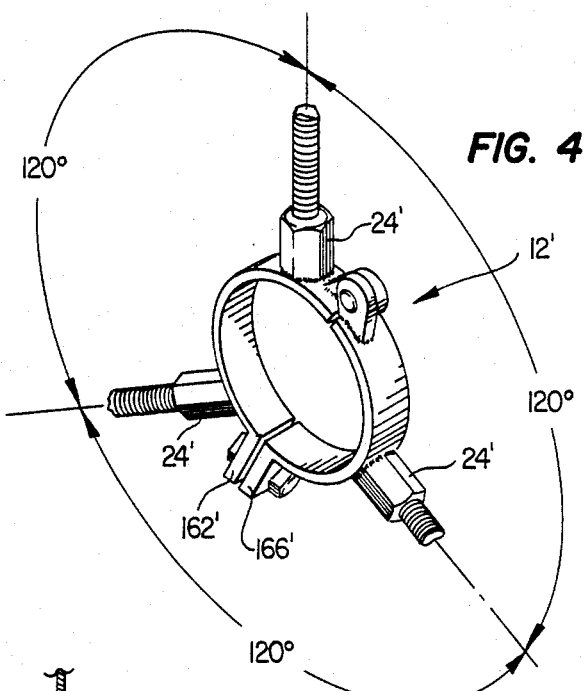
FIG. 4
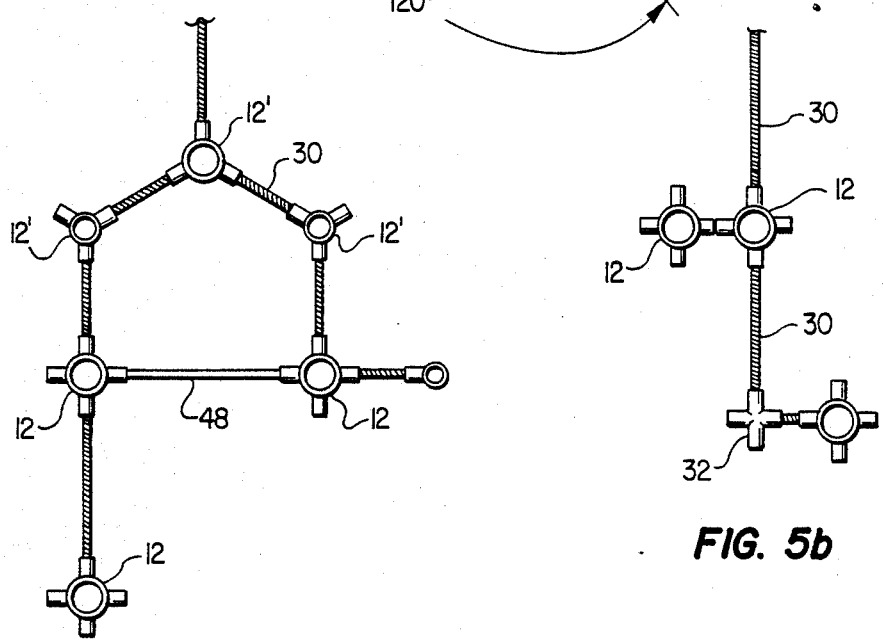
FIG. 5a
FIG. 5b

MULTIPLE CONDUIT SUPPORT SYSTEM

TECHNICAL FIELD

This invention relates to apparatus for hanging and supporting conduit and, in particular, to a system of threaded components adaptable for supporting multiple conduit lines.

BACKGROUND OF THE INVENTION

In the construction industry, various types and sizes of pipes are used as conduits for electrical wiring, oil and gas distribution, and plumbing systems. Industrial, commercial and residential buildings normally require many different sizes and types of conduit that must be hung or otherwise supported from some structural member at regular intervals along the length of travel of the conduit.

Most construction jobs require a large stock of fasteners and hangers to accommodate the many different sizes and shapes of pipe and the infinitely variable geometry of the structures from which the pipe must be supported. Some hangers are available for supporting a plurality of conduits from a common structural member. However, most of the multiple conduit support systems presently available are adapted only to support the pipes in a relatively fixed geometric relationship to each other. As a result, it is common to have separate fasteners and hangers for every conduit line that is not closely spaced from a parallel conduit line.

Due to the limitations of the currently available conduit fasteners and hangers, there is a need for a conduit hanging system comprising a few adjustable components that may be connected and easily adapted to a large number of geometries to provide rigid support for multiple conduits at various points along their common lengths of travel.

SUMMARY OF THE INVENTION

The present invention is a system of threaded components that is adaptable for hanging and supporting multiple conduit lines in industrial, commercial and residential buildings. The system includes three basic components in various sizes and/or lengths that are threaded so that they may be combined in many various geometric relationships to support multiple conduit lines from common points along the length of the lines throughout the building.

A basic component of the system is a support ring that may be constructed in various diameters so as to clamp around various sizes of conduit. The support ring may comprise two semicircular sections hinged together at one end so that the ring may be opened to fit around a pipe. Opposite the hinge, the ring may include a fastener for clamping the ring tightly around the pipe. The support ring includes a plurality of internally threaded connectors attached around the outer periphery of the ring with their axes extending radially outward therefrom.

A second component of the system comprises various lengths of threaded rods adapted for threading into the threaded connectors attached to the support rings. The various lengths of threaded rod allow a support ring to be suspended or supported at any required distance from a building structural member.

A third component of the system is a cross-shaped member having two internally threaded bores extending through the cross member along its two major axes. The cross member is adapted to be threaded onto a vertical support rod and positioned anywhere along the length of the threaded rod. The other bores of the cross member are adapted to receive threaded rods in the approximately horizontal plane. Each of the horizontal rods extending from the cross member may be connected to a support ring for supporting a conduit line.

Through the use of cross members, various sizes of support rings, and various lengths of threaded rods, the conduit support system of the present invention can be adapted to support sections of multiple conduit lines from a common point in nearly any configuration and construction environment. In addition, the support system of the present invention allows the subsequent addition of other conduit lines merely by attaching additional support rings, threaded rods, and cross members to support the added conduit lines.

BRIEF DESCRIPTION OF THE DRAWINGS

A more complete understanding of the present invention and the advantages thereof may be gained by reference to the following Description of the Preferred Embodiments taken in conjunction with the accompanying Drawings, in which:

FIG. 4 is a perspective view showing an alternative configuration of the support ring used in the present invention, and FIGS. 5a and 5b illustrate additional alternative installation configurations permitted by the present conduit support system.

DESCRIPTION OF THE PREFERRED EMBODIMENTS

Figure 1:
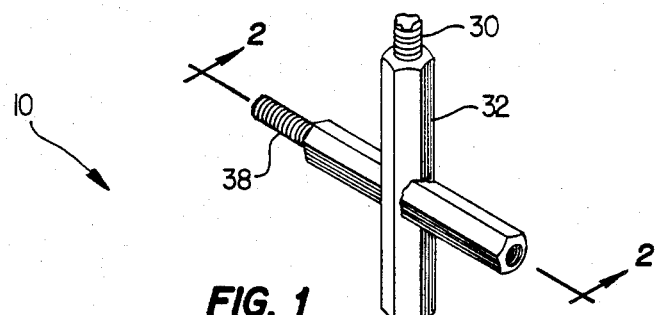
FIG. 1 is a perspective view showing an assembly of the various components of the present invention.

Referring to the Drawings, the various components of the multiple conduit support system 10 of the present invention are illustrated in FIG. 1. A basic component of conduit support system 10 is support ring 12. Support ring 12 comprises two semicircular sections 12a and 12b. Ring sections 12a and 12b are joined together at one end by a hinge 14. Hinge 14 allows sections 12a and 12b to pivot open to be placed around a pipe. The ends of the sections 12a and 12b opposite hinge 14 may include flanges 16a and 16b, respectively. Flanges 16a and 16b include a bore through which a bolt 18 extends to be threaded into a nut 20. Thus, after support ring 12 has been fitted around a conduit, bolt 18 may be inserted through flanges 16a and 16b and tightened on nut 20 so that support ring 12 may be clamped tightly around the pipe. Support ring 12 may be manufactured with various inside diameters, as further illustrated by support ring 22, so that conduit of an outside diameter may be clamped tightly by a support ring.

Support ring 12 includes a plurality of internally threaded connectors 24 attached around the circumference of ring 12 and extending radially outward therefrom. Threaded connectors 24 are adapted to receive threaded rods such as rods 26, 28, and 30. The threaded rods serve to connect the other components of system 10, such as support ring 22 connected to support ring 12 by rod 26. Lock nut 25 may be used to lock support ring 12 in the desired position on threaded rod 30. Similar lock nuts may be used to lock the other components of system 10 in the desired position on the threaded rods.

Figure 2:
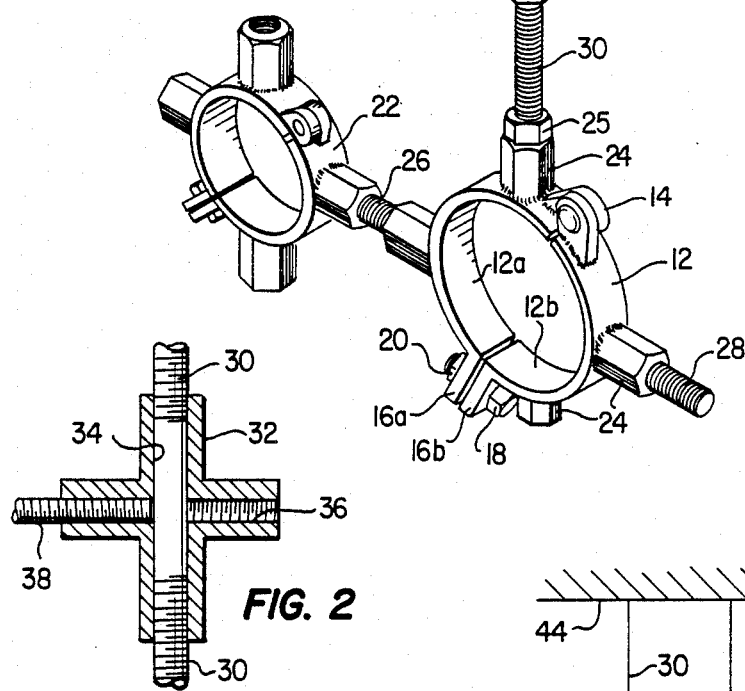
FIG. 2 is a longitudinal section of the cross member of the present invention.

Another component of conduit support system 10 is a cross-shaped member 32. As illustrated in a longitudinal section in FIG. 2, cross member 32 has a threaded bore 34 through its vertical axis and a threaded bore 36 through its horizontal axis. As illustrated in FIGS. 1 and 2, cross member 32 is threaded onto threaded rod 30 and may be positioned at any desired location along threaded rod 30. Additional threaded rods, such as rod 38, may be threaded into either or both ends of threaded bore 36. If it is not necessary for rod 30 to extend through cross member 32, cross member 32 may be positioned horizontally anywhere along threaded rod 38 as it extends through cross member 32.

Figure 3A:
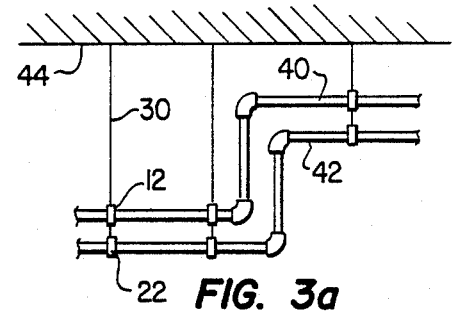
FIGS. 3a, 3b, and 3c illustrate various installation configurations of the multiple conduit support system of the present invention.
Figure 3B:
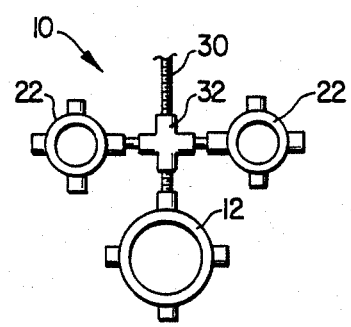
Figure 3C:
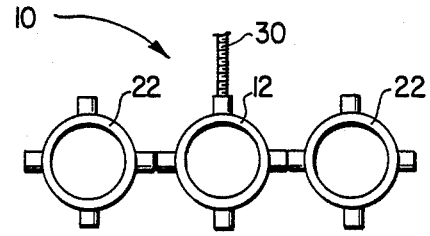

Various configurations and connections of conduit support system 10 are shown in FIGS. 3a, 3b and 3c, wherein the same or similar components are identified by the same reference numerals as in FIGS. 1 and 2. In FIG. 3a, conduit lines 40 and 42 are shown suspended from a building structural member 44. Threaded rod 30 is anchored in support member 44 to provide support for conduit lines 40 and 42. Support ring 12, which is clamped around conduit line 40, and support ring 22, which is clamped around conduit line 42, are hung from threaded rod 30 as described above. It will be appreciated by those skilled in the art that in use of the present invention, rod 30 and its attachment in support member 44 will be designed to have a load carrying capability sufficient to support the final composite load attached from the rod. Of course, such capability can be easily provided for by using conventional hardware and construction techniques.

FIG. 3b illustrates a configuration of conduit support system 10 wherein cross member 32 is threaded on rod 30. Cross member 32 is used to position support rings 22 and support ring 12 as illustrated. In FIG. 3c, support rings 22 are connected to either side of support ring 12 which is threaded on support rod 30.

Although connectors 24 shown in FIG. 1 are equally spaced 90° around the circumference of ring 12, the invention is not so limited. As shown in FIG. 4, support ring 12' can be fabricated with connectors 24' positioned, for example, at 120° spacings with flanges 16a' and 16b' arranged so as not to interfere with the positioning of the connectors. It will be understood by those skilled in the art that support ring 12' may be designed with connectors 24' positioned about the circumference of ring 12' as needed for a particular application.

By way of illustration, FIGS. 3a, 3b, and 3c show several of the many possible configurations for conduit support system 10 of the present invention. One advantage of support system 10 is that sections of several parallel conduit lines may be supported from a single support rod 30. Typically, the larger and heavier conduit lines are supported by support rings 12 connected vertically from support rod 30, and the smaller and lighter conduit lines may be supported by support rings 22 connected on either or both sides of a cross member 32 or a larger support ring 12. Furthermore, conduit support system 10 has the benefit of support rings 12 and 22 and cross members 32 that include a plurality of threaded connection points for adding additional conduit lines to a previously installed support system 10. Further, by simply using different lengths of threaded rods 30, conduits can be positioned at any lateral and vertical position.

Similarly, conduits of any size can be incorporated into the system as needed with only minimal design required to assume a balanced loading configuration. For example, the unlimited possibilities for different configurations are shown in FIGS. 5a and 5b. As can be seen in FIG. 5a, a symmetrical arrange of conduits is not required, nor must spacing be equal. Referring to FIG. 5a, to facilitate assembly, cross rod 48 may be unthreaded and of a diameter which can be received into threaded bores 36. In the arrangement of FIG. 5a, rod 48 is loaded only in compression, and thus a smaller diameter rod would be capable of supporting the loads encountered.

Similarly, FIG. 5b illustrates that the present system can accommodate conduits of different sizes and permits positioning the conduits as needed by simply varying the length of the rods used in interconnecting the support rings. Therefore, it can be seen that conduit support system 10 can support sections of multiple conduit lines in any configuration from a single support point, can be installed easily and quickly, and can accommodate the addition of new conduit lines supported from a previously installed support system of the present invention.

Although the present invention has been described with respect to specific embodiments thereof, various changes, modifications, and rearrangements of the components of the invention will be suggested to one skilled in the art. Therefore, it is intended that the present invention not be limited to the specific embodiments described but encompass such changes and modifications as fall within the scope of the appended claims.

I claim:

1. Apparatus for supporting multiple conduit lines from a structural member, comprising:
    a support rod attachable to the structural member;
    a plurality of support rings adaptable to surround the conduit lines, each of said rings having a circumference with a plurality of ring connectors extending therefrom, a first support ring having a first connector adaptable for connecting said first ring to said support rod, and said first support ring also having a second connector adaptable for connecting said first ring to a second support ring; and
    a connecting rod adaptable for use with said ring connectors in rigidly connecting one ring to another, and said connecting rod connecting the second connector on the first support rig to a connector on the second ring.

2. The apparatus of claim 1 further comprising a second connecting rod for connecting a third of said rings to said first or said second ring.

3. The apparatus of claim 1 further comprising a supplemental connecting member having a plurality of supplemental connectors adaptable for connecting said supplemental member to said support rod and to said connecting rod.

4. The apparatus of claim 3 wherein said supplemental member comprises a cross-shaped joint.

5. The apparatus of claim 4 wherein said cross-shaped joint comprises a vertical section having a longitudinal bore therethrough for receiving said support rod and a pair of arms extending horizontally from said vertical section and on opposing sides thereof, each of said horizontal arms having a longitudinal bore adapted for receiving said connecting rod.

6. The apparatus of claim 5 wherein all of said rods include external threads and all of said connectors and bores comprise bores having internal threads for receiving said threaded rods.

7. The apparatus of claim 1 wherein said ring connectors extend radially from said rings.

8. Apparatus for supporting multiple conduit lines from a structural member, comprising:
- a support rod attachable to the structural member;
- a plurality of support rings adaptable to surround the conduit, each of said rings having a circumference with a plurality of ring connectors extending radially therefrom, each of said ring connectors having a radially extending bore with internal threads, wherein one of said ring connectors is adaptable for connecting a first of said rings to said threaded support rod;
- a cross-shaped member having a vertical section with a longitudinal internally threaded bore and a horizontal section extending from said vertical section and having a horizontally extending internally threaded bore, wherein said vertical threaded bore is adaptable for receiving said threaded support rod; and
- a plurality of threaded connecting rods adaptable for connecting each of said rings and said cross-shaped member to another of said rings.